UNITED STATES PATENT OFFICE.

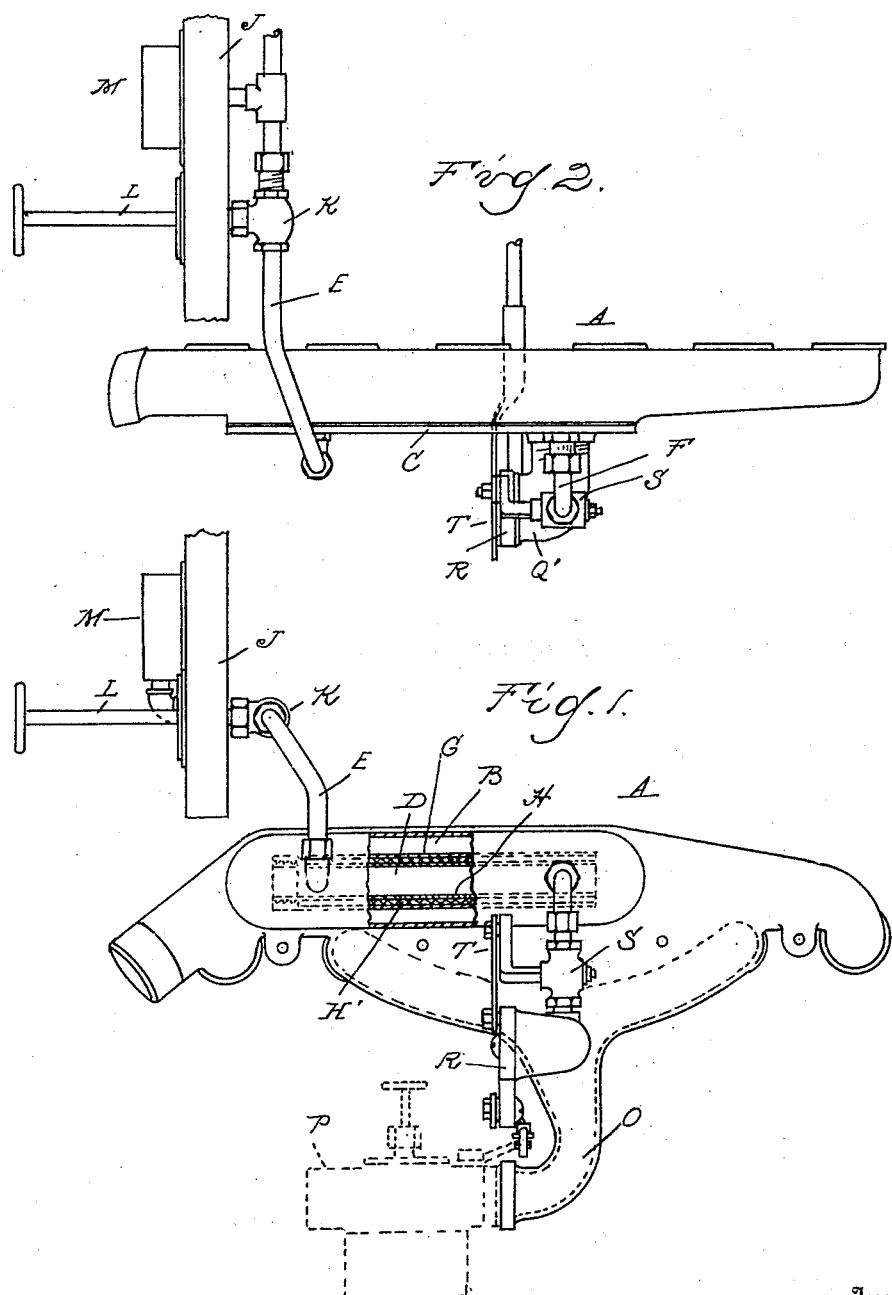

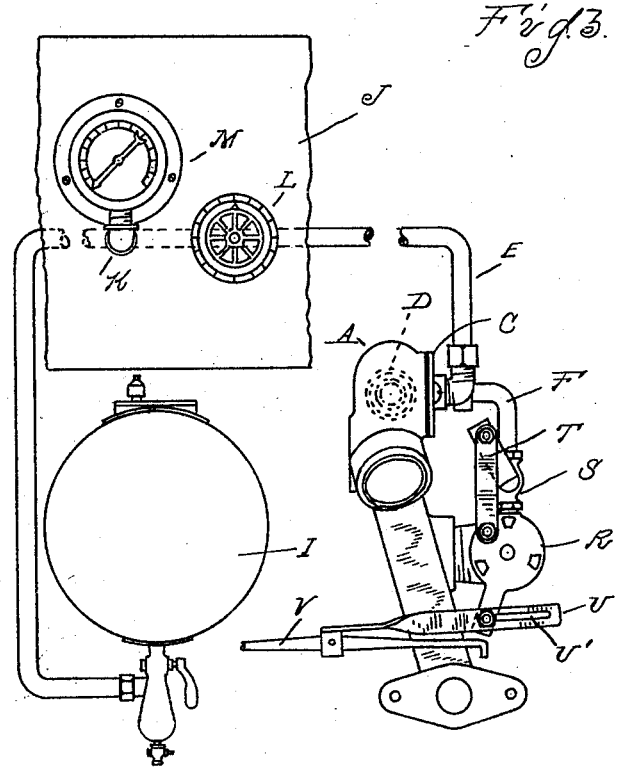

WILLIAM MARTIN, OF DETROIT, MICHIGAN.

FUEL VAPORIZER.

1,411,575.	Specification of Letters Patent.	Patented Apr. 4, 1922.

Application filed June 6, 1919. Serial No. 302,192.

*To all whom it may concern:*

Be it known that I, WILLIAM MARTIN, a citizen of the United States of America, residing at Detroit, in the county of Wayne and State of Michigan, have invented certain new and useful Improvements in Fuel Vaporizers, of which the following is a specification, reference being had therein to the accompanying drawings.

The invention relates to fuel vaporizers for internal combustion engines, being particularly designed for use with kerosene or other low grade fuels. The invention consists in various features of construction as hereinafter set forth.

In the drawings:

Figure 1 is a side elevation showing a replacement combined inlet and exhaust manifold with the fuel vaporizer incorporated therein;

Figure 2 is a plan view thereof;

Figure 3 is an end elevation.

My improved vaporizer is arranged within the exhaust manifold and to facilitate such an arrangement I preferably form the inlet and exhaust manifolds integral. As shown, A is a manifold conforming to the general contour of the standard construction of inlet and exhaust manifolds but with the two integrally united. B is an elongated opening in the front of the manifold opening into the exhaust passage, and C is a cover plate for closing this opening. D is the vaporizer inserted through the opening B and having supply and discharge connections E and F passing through the cover plate C. The vaporizer preferably comprises an outer tubular member G of smaller diameter than the internal diameter of the exhaust passage and an inner tubular member H, which is spaced from the outer member so as to leave an annular chamber therebetween. The ends of the tubes are united to each other, preferably by a threaded engagement and the supply and discharge conduits E and F are connected with the annular chamber. This chamber is also filled with a porous indestructible medium, preferably asbestos fiber. The arrangement is such that the exhaust gases in passing through the manifold will come in contact with both the outer and inner surfaces of the vaporizer and will raise the temperature thereof to a point where the liquid fuel will be readily vaporized.

I is the liquid fuel tank arranged in any suitable location and where the tank is below the level of the vaporizer, the liquid is elevated by air pressure. The supply conduit E which leads from the tank to the vaporizer preferably passes adjacent to the dash J of the vehicle and is provided with a controlling valve K which may be operated by a handle L in front of the dash. There is also preferably provided a pressure gauge M for indicating the pressure upon the fuel. O is the portion of the inlet manifold which is normally connected with the carburetor P, indicated in dotted lines. Q is a conduit connecting into the inlet manifold and having at its outer end a controlling valve or shutter R by which the amount of air admitted may be regulated. S is a valve in the discharge conduit F for regulating the amount of vapor passing therethrough, said conduit being connected into the conduit Q so as to commingle the fuel vapor and the air. The valves R and S are preferably connected by a link T so as to be actuated correspondingly and one of the valves, such as R, may be operated by a member U connected to the rod V which normally controls the throttle.

With the construction as described, where it is desired to apply the vaporizer to an engine already in service, the standard inlet and exhaust manifolds are detached and the manifold A is connected to the engine. Where it is desired to operate the engine alternatively on kerosene and gasoline, the regular carburetor may be attached to the replacement manifold and used with gasoline or other volatile liquid fuels, particularly for starting the engine. As shown, the connection U between the throttle operating rod V and the valve R has a lost motion by reason of a slot U' therein, so that the throttle with the normal carburetor may be operated in the usual way and when the throttle is closed, the valves R and S may be actuated.

In operation, after the engine has been started by the normal carburetor and the manifold A has become well heated, the valve K is opened by means of the handle L so as to admit the kerosene into the vaporizer; here it will come into contact with the heated outer and inner walls G and H and will also pass through the porous, asbestos or other body, indicated at H'. The result is that the liquid will be vaporized before it reaches the discharge conduit F and only vapor will be discharged and commingled with the air in the conduit Q. The amount thus discharged is controlled by the valve S and as this valve is operated proportionately to the operation of the valve R, the proper proportion of air and fuel vapor will be maintained. The forming of the inlet and exhaust manifolds integal with each other has the advantage that the mixture is warmed by heat conducted through the integral walls from the exhaust passage to the inlet passage.

What I claim as my invention is:

1. The combination with an internal combustion engine, of an exhaust manifold therefor having an opening in the outer face thereof, a cap for closing said opening, a vaporizer arranged longitudinally within said manifold and having connections passing inward and outward through said cap and forming respectively a liquid supply conduit and a vapor discharge, and a connection between said vapor discharge and the inlet manifold.

2. The combination with an internal combustion engine, of an exhaust manifold having an elongated opening in the outer face thereof, a fuel vaporizer inserted through said opening, a cap for closing said opening, connections to said vaporizer passing through said cap, one of said connections constituting a fuel supply and the other a vapor discharge, an air conduit connecting with the inlet manifold into which said vapor conduit discharges, and means for proportionately controlling the vapor and air.

3. The combination with an internal combustion engine, of a replacement manifold therefor having integral inlet and exhaust portions, said exhaust portion being provided with an elongated opening in the front wall thereof, a vaporizer inserted within said exhaust conduit through said opening, a closure for said opening, fuel supply and vapor discharge connections passing through said closure, valves for controlling said supply and discharge connections, an air inlet passage connecting with the inlet manifold in which the vapor is discharged, and means for proportionately controlling the air and vapor.

4. The combination with an internal combustion engine, of an exhaust manifold thereof, having an opening in the outer face thereof, a cap forming a detachable closure for said opening, a vaporizer arranged longitudinally within said manifold and supported upon said cap by the intake and outlet connections of said vaporizer, said connections being extended through said cap and a connection between the vapor discharge and the inlet manifold.

5. The combination with an internal combustion engine, of an intake and exhaust manifold therefor, a fuel vaporizer disposed within the exhaust manifold, an air conduit connecting with the inlet manifold, a discharge connection from said vaporizer into said air conduit, a fuel supply connection to said vaporizer and means for proportionately controlling the vapor and air.

6. The combination with an intake manifold of an internal combustion engine, of an air conduit connecting with said manifold, a fuel vaporizer, means for heating the same, a fuel supply connection to said vaporizer, a discharge connection from the vaporizer opening into said air conduit, and means for proportionately controlling the vapor and air.

In testimony whereof I affix my signature.

WILLIAM MARTIN.